Oct. 4, 1932.  W. M. VENABLE  1,880,608
SHEAVE BLOCK
Filed March 20, 1930   2 Sheets-Sheet 2

INVENTOR
William M Venable
BY
ATTORNEYS

Patented Oct. 4, 1932

1,880,608

UNITED STATES PATENT OFFICE

WILLIAM MAYO VENABLE, OF PITTSBURGH, PENNSYLVANIA, ASSIGNOR TO BLAW-KNOX COMPANY, OF PITTSBURGH, PENNSYLVANIA, A CORPORATION OF NEW JERSEY

SHEAVE BLOCK

Application filed March 20, 1930. Serial No. 437,316.

This invention relates to sheave blocks employing a number of sheaves turning on a common axis and it is useful wherever there are several sheaves in the same block. The invention is particularly adaptable for use in clam shell buckets or similar buckets, where the loads per sheave are usually large in comparison to the space available for the sheave mounting.

The nature, objects and advantages of the invention will be best understood from the following brief statement. Where a number of sheaves turn on the same axis it is customary to mount them on the same pin, which pin must be supported in some manner. If there be but one or two sheaves, the pin upon which they turn may be supported at its ends, but if there be three or more sheaves, supports for the pin may be introduced between the sheaves, as the use of such intermediate supports relieves the pin of bending stresses and makes it possible to use a pin of smaller diameter. In certain classes of service and under certain circumstances, it is frequently inconvenient, if not impractical, to use intermediate supports in the manner heretofore employed.

One of the primary objects of my invention is to provide a novel and effective support for the pins intermediate the sheaves in the block which is simple to manufacture and to assemble.

Another object of the invention is to provide a sheave assembly or unit which may be placed in or removed from the block as a unit.

Another object of the invention is to provide supporting means for the pin adapted to the use of ball bearings in the sheaves.

A more specific object of the invention is to provide guards preventing the ropes from leaving the sheave scores and becoming wedged between the sheaves.

My invention also contemplates the provision of a sheave assembly which can be readily lubricated and in which the bearings may be sealed against dirt, dust, water or other materials to which the sheaves may be exposed in service.

Still another object of the invention resides in so mounting the sheave assembly in the sheave block that the sheave assembly may be assembled and then mounted in the block without causing any binding of the parts.

How the foregoing advantages are obtained is illustrated in the preferred form in the accompanying drawings wherein I illustrate my invention as applied to an assemblage of five sheaves on one pin and wherein—

Figure 1:
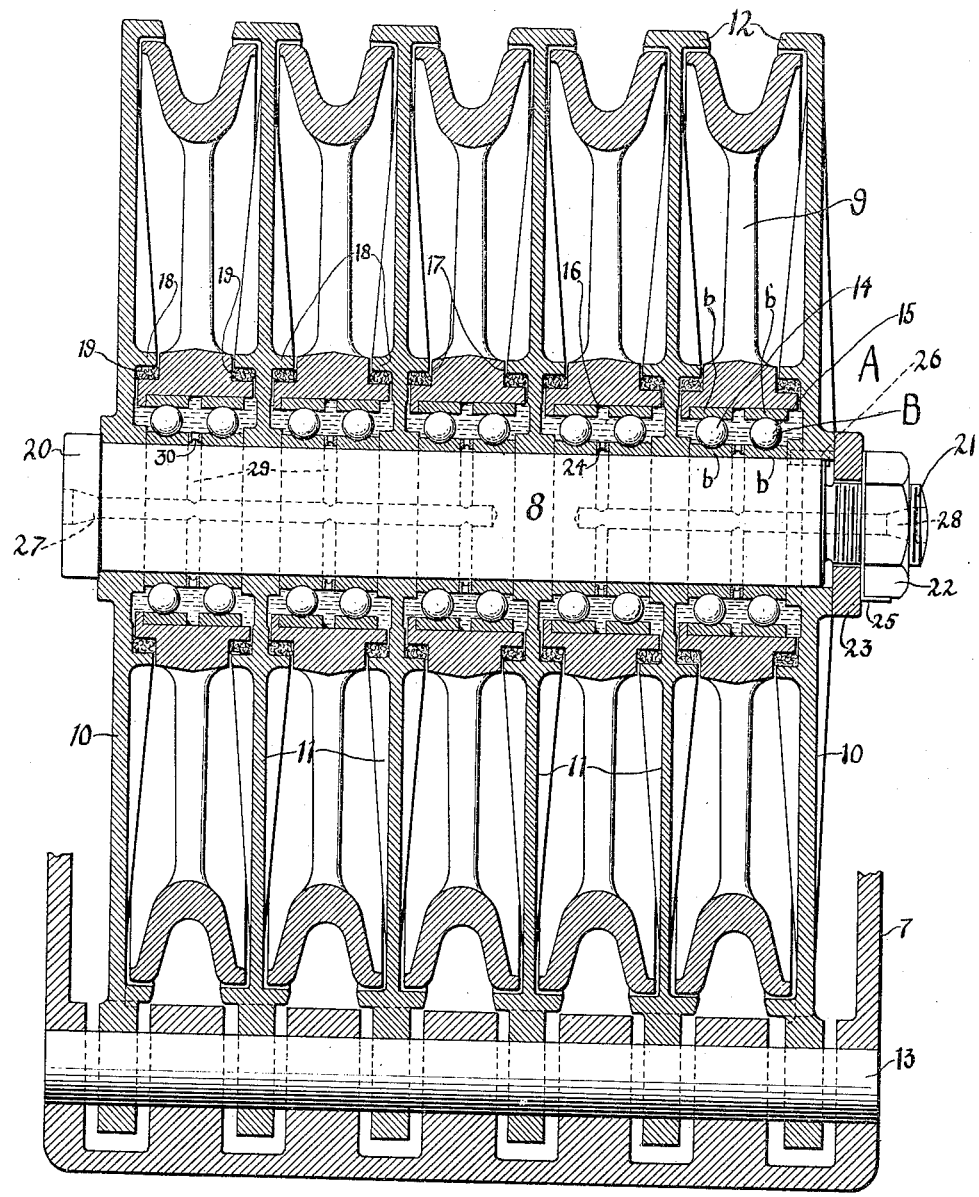
Figure 2:
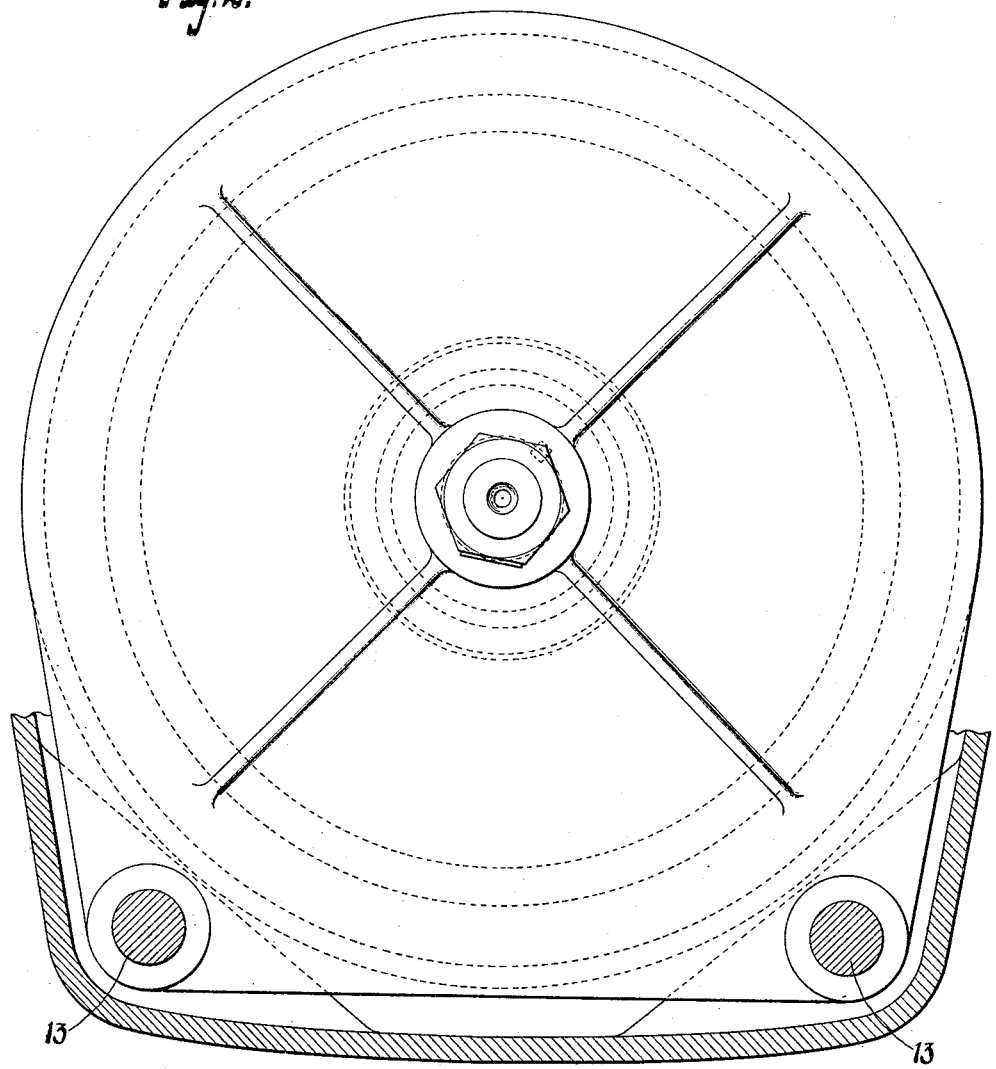

Fig. 1 is a vertical section through the sheave assembly and the block, the block being broken away, and Fig. 2 is a section through the block illustrating the sheave assembly in end elevation.

Referring now to Fig. 1, the sheave block is shown at 7 and the sheave assembly is indicated as a whole by the reference character A. This assembly comprises the sheave pin 8, the five sheaves 9, laterally spaced from one another, the end disks 10, the disks 11 intermediate the sheaves and the ball bearing means B. The end disks 10 serve to support the ends of the sheave pin and at the same time constitutes end plates for the sheave assembly, guarding the outside flanges of the end sheaves. The intermediate disks 11 support the sheave pin at points intermediate the sheaves and they also guard the flanges of the sheaves. Both the end disks and the intermediate disks are peripherally flanged at 12 to cover over the gaps between sheaves, preventing the ropes from leaving the sheave scores and becoming wedged between sheaves.

All of the disks are bored to fit the pin accurately and the disks are supported in the sheave block by means of two pins 13, the location of which in the block depends upon the mechanism in which the block may be incorporated, the disks being apertured to receive such pins.

As shown the sheave pin is of uniform diameter, but if, for any reason, any part of the pin has a smaller diameter than another, each disk is made to fit the pin at its appropriate place.

Each sheave is shown provided with two separate ball bearings 14 and 15, this being the preferred arrangement for heavy loads because of considerations of size and costs.

For light loads single ball bearings may be employed. Each ball bearing consists of an inner race b which fits snugly but not tightly on the sheave pin, a number of balls and an outer race b' which fits snugly into the hub of a sheave. Where two bearings are used for each sheave, one of them is secured to the hub as by electric welding indicated at 16, while the other is not secured, but is free to move endwise if there is any occasion for it to do so. Thus, all of the end thrust, if any, is taken by one bearing, the other bearing merely sustaining vertical load.

The manufacture of the sheaves may be completed and the bearings installed therein before assembly of the sheaves in the block.

The hub of each sheave on each side is provided with shoulders 17, turned true and finished, so as to cooperate with shoulders 18 on the disks which are also preferably finished. The shoulders 17 and 18 cooperate to provide annular cavities 19 which may be filled with grease or packing and which seal the bearing against foreign material.

On one end of the sheave pin is a head 20 and the other end of the sheave pin is turned down to provide a threaded portion 21 for receiving the holding nut 22. A washer 23 is placed under the head of the nut and bears against the hub portion of the corresponding outer disk 10. Annular spacers 24 are provided between inner races.

From the foregoing description the manner of assembling the sheave assembly will be clear. The dimensions of the pin, the disks, the races, and the fillers are such that when all of the parts are assembled as shown in Fig. 1, sufficient running clearance is provided between moving parts. When the nut is tightened all of the disks and inner races are held rigidly against one another, leaving the sheaves, however, free to turn, with no more end play than the ball bearings allow, which, for practical purposes, is negligible.

A lock washer 25 is provided for the nut 22 and similar locking instrumentalties may be employed to keep the pin from turning, such, for example, as the key 26.

Before assembling the unit in the sheave block, the nut 22 is not turned tight so that the pins 13 may be inserted readily. After the pins 13 are in place, the nut 22 is drawn up tightly. It will be observed that there is ample clearance between the disks and the sheave block, this being provided to permit some end play of the disks on the pins when the nut is tight.

Thus no difficulty is experienced in making assembly, and while the holes through which the pins 13 pass must be accurately located in both disks and block, great precision is not required in facing the parts through which the holes 13 are drilled.

Lubricant is supplied to the bearings by means of central holes 27 and 28 drilled in the sheave pin and by means of the cross apertures 29 which communicate with the central holes and with the bearings through holes 30 in the fillers 24. Grease or other lubricant may be forced or introduced into and retained in the central holes in any preferred manner.

It will be clear that the pins 13 need only be of a diameter sufficient to prevent shear, as they are supported practically throughout their length. Simple removal of the pins 13 permits of removal of the sheave assembly.

I claim:—

1. In sheave construction, a sheave block, and a sheave assembly or unit comprising a sheave pin, a plurality of sheaves on said pin, and means intermediate the sheaves for supporting the sheave pin, said means being supported from the sheave block for removal of the sheave assembly as a unit.

2. The combination of a sheave block and a sheave assembly or unit carried by the block as such, said assembly including a sheave pin supported at its ends and at an intermediate point or points from said block.

3. In sheave construction, a sheave block; a sheave assembly including a sheave pin, a plurality of sheaves, and a plurality of pin supporting members affording support for the pin at the ends and intermediate sheaves; and means whereby all of said members are supported from the block as a detachable unit.

4. In sheave construction, a sheave block; a sheave assembly including a sheave pin, a plurality of sheaves, and a plurality of pin supporting members affording support for the pin at the ends of and intermediate the sheaves; and means whereby all of said members are supported from the block as a detachable unit; the sheaves being laterally spaced from one another and the supporting members closing the gaps between sheaves.

5. In sheave construction, a sheave block, a sheave assembly including a sheave pin, a plurality of flanged sheaves, and a plurality of pin supporting members affording support for the pin at the ends of and intermediate the sheaves; and means whereby all of said members are supported from the block as a detachable unit; the sheaves being laterally spaced from one another and the supporting members closing the gaps between sheaves and overlapping the sheave flanges.

6. In sheave construction, a sheave block; a sheave assembly including a sheave pin, a plurality of sheaves, and a plurality of pin supporting members affording support for the pin at the ends of and intermediate the sheaves; and means whereby all of said members are supported from the block as a detachable unit; said supporting members having a diameter approximating that of the sheaves.

7. In sheave construction, a sheave block;

a sheave assembly including a sheave pin, a plurality of flanged sheaves, and a plurality of pin supporting members affording support for the pin at the ends of and intermediate the sheaves; and means whereby all of said members are supported from the block as a detachable unit; said supporting members having a diameter greater than that of the sheaves and being flanged to overlap the sheave flanges.

8. In sheave construction, a sheave block, a sheave assembly including a sheave pin, a plurality of sheaves, and a plurality of pin supporting members affording support for the pin at the ends and intermediate sheaves; and means whereby all of said members are supported from the block as a detachable unit; the said members having freedom for play in the sheave block.

9. In sheave construction, a sheave pin, a plurality of spaced sheaves, and a plurality of members affording support for the pin at a plurality of spaced points, together with packing means, said sheaves and members cooperating to retain the packing.

10. In sheave construction, a sheave pin, a plurality of spaced sheaves, and a plurality of members affording support for the pin at a plurality of spaced points, said sheaves and members having shoulders cooperating to provide an annular space, and packing in the spaces.

11. The combination of a sheave pin having a head at an end thereof, a plurality of sheaves mounted on said pin, pin supporting members intermediate the sheaves, means at the other end of the pin for clamping the sheaves and the supporting members against said head to constitute a sheave assembly or unit, a sheave block, and means for detachably mounting the supporting members on said block whereby the sheave assembly can be removed or replaced as a unit.

12. The combination of a sheave pin, a plurality of sheaves mounted thereon, pin supporting members intermediate the sheaves, means for clamping the sheaves and the supporting members on said pin to constitute a sheave assembly or unit, a sheave block, and means for detachably mounting the supporting members on said block whereby the sheave assembly can be removed or replaced as a unit.

13. The combination of a sheave pin, a plurality of sheaves mounted thereon, pin supporting members intermediate the sheaves, means for clamping the sheaves and the supporting members on said pin to constitute a sheave assembly or unit, a sheave block, and means for detachably mounting the supporting members on said block whereby the sheave assembly can be removed or replaced as a unit, said mounting means permitting limited movement of the assembly longitudinally of the pin.

14. The combination of a sheave pin, a plurality of bearing races on the pin, a plurality of sheaves mounted on said races, pin supporting members between the races, and means for clamping the races and the supporting members on the pin as a readily detachable sheave unit.

15. The combination of a sheave pin, a plurality of bearing races on the pin, a plurality of sheaves having bearings mounted on said races, pin supporting members between the races, and means for clamping the races and the supporting members on the pin as a readily detachable sheave unit, together with lubricating passages in the pin delivering to the bearings between said races.

16. The combination of a sheave pin, a plurality of bearing races on the pin, a plurality of sheaves mounted on said races, pin supporting members between pairs of races, spreader means between the races of a pair, and means for clamping the races, the supporting means and the spreader means on the pin as a readily detachable sheave unit.

17. The combination of a sheave pin, a plurality of bearing races on the pin, a plurality of sheaves having bearings mounted on said races, pin supporting members between pairs of races, spreader means between the races of a pair, and means for clamping the races, the supporting means and the spreader means on the pin as a readily detachable sheave unit, together with lubricating passages in the pin delivering to the bearings through said spreader means.

In testimony whereof I have hereunto signed my name.

WILLIAM MAYO VENABLE.